(12) United States Patent
Chao et al.

(10) Patent No.: US 6,999,067 B2
(45) Date of Patent: Feb. 14, 2006

(54) ELECTROMAGNETIC INDUCTION PEN-LIKE DEVICE WITH WRITING FUNCTION

(75) Inventors: Ching-Chuan Chao, Taipei (TW); Ping-Hung Chen, Tainan (TW); Chung-Wen Hsu, Kaohsiung (TW)

(73) Assignee: Aiptek International Inc., Hsin-Chu (TW)

( * ) Notice: Subject to any disclaimer, the term of this patent is extended or adjusted under 35 U.S.C. 154(b) by 273 days.

(21) Appl. No.: 10/330,056

(22) Filed: Dec. 30, 2002

(65) Prior Publication Data

US 2004/0125089 A1 Jul. 1, 2004

(51) Int. Cl.
*G09G 5/00* (2006.01)

(52) U.S. Cl. .................... 345/179; 178/18.01; 401/45

(58) Field of Classification Search ............... 345/173, 345/179; 178/18.01, 18.03, 18.05, 19.03, 178/19.01; 401/45; 347/109
See application file for complete search history.

(56) References Cited

U.S. PATENT DOCUMENTS

| | | | | |
|---|---|---|---|---|
| 5,548,092 A | * | 8/1996 | Shriver .................... | 178/19.01 |
| 5,571,997 A | * | 11/1996 | Gray et al. ............... | 178/19.04 |
| 5,576,502 A | * | 11/1996 | Fukushima et al. ...... | 73/862.68 |
| 5,581,052 A | * | 12/1996 | Padula et al. ............ | 178/19.04 |
| 5,652,412 A | * | 7/1997 | Lazzouni et al. ........ | 178/18.01 |
| 5,756,941 A | * | 5/1998 | Snell ....................... | 178/19.01 |
| 6,536,972 B1 | * | 3/2003 | Bramlett et al. .......... | 401/16 |
| 6,808,330 B1 | * | 10/2004 | Lapstun et al. ............ | 401/45 |

* cited by examiner

*Primary Examiner*—Amr A. Awad
*Assistant Examiner*—Kimnhung Nguyen
(74) *Attorney, Agent, or Firm*—Arent Fox PLLC

(57) ABSTRACT

An electromagnetic induction device with a writing function is disclosed in this present invention. The design of this invention combines an electromagnetic induction device and a writing device in a pen-like device. The electromagnetic induction device can be employed as a pointer device of a tablet. The writing device can be used as an ink pen. Moreover, while writing on paper, the tablet can detect and calculate the coordinates of the writing device and save the coordinates in memory device, such as a RAM. After communicating with the host machine, the monitor can response and display the handwriting trace. Hence, it is very convenient for a user to bring and carry a pen-like device with multiple functions according to this invention.

23 Claims, 7 Drawing Sheets

ELECTROMAGNETIC INDUCTION PEN-LIKE DEVICE WITH WRITING FUNCTION

BACKGROUND OF THE INVENTION

1. Field of the Invention

This present invention relates to an electromagnetic induction device, and more particularly, to an electromagnetic induction pen-like device with writing function.

2. Description of the Prior Art

Currently, the most widely used computer input devices include the keyboard and mouse. Due to the advancement of digital technologies, more and more computer users are starting to work with digitizer-based devices such as a digitizer tablet, which allow a user to write and draw upon the working area of the tablet and have the signals and codes interpreted by a computer. Specifically, the working area of the tablet provides a writing surface for capturing the position, pressure and the key status of an object, such as a pen or a mouse, and the information from pressure and actuated keys etc. In cooperation with the tablet, a pen-like device is required to create such objects.

One pen-like device is disclosed in U.S. Pat. No. 4,697,050, as shown in FIG. 1. The pen-like device comprises a writing device 110 and an erasing device 120. The writing device 110 and the erasing device 120 can be employed for inputting and correcting on a tablet. The above-mentioned pen-like device further comprises a battery 130 therein. The battery has to be charged or changed periodically. The problem such as the breakdown or aging of the battery becomes a pain in the neck for the user. In order to charge the battery, there is a metal contact 135 on the shell of the pen-like device. The metal contact 135 may induce the dangers of electrical leakage to the user. Moreover, an oscillator circuit 140 and a charge circuit 145 are employed in the above-mentioned pen-like device. The above-mentioned circuit design will increase the complexity, the chance for breakdown and the cost of the pen-like device. Furthermore, sometimes the oscillator circuit 140 may cause large inaccuracies in the pen-like device.

Referred to FIG. 1B, another pen-like device is disclosed in U.S. Pat. No. 5,576,502. The above-mentioned pen-like device comprises a writing portion 150 at one side of the pen-like device, and a rubber portion 160 at the other side of the pen-like device. The rubber portion 160 is employed for handwriting trace correction of the writing portion 150 on a tablet. However, in the above-mentioned pen-like device, in order to add the correction function, the addition of large members and circuits will increase the complexity and cost of the pen-like device.

Hence, it is an important object of this invention to provide a pen-like device without the defects in the prior art. Additionally, it is also an important object of this invention to provide an electromagnetic pen-like device with multiple functions.

SUMMARY OF THE INVENTION

In accordance with the present invention, an electromagnetic induction pen-like device with a writing function is provided for performing handwriting input on a tablet by an electromagnetic induction device at one side of the pen-like device of this invention, and performing the usual writing function of a writing device at the other side of the pen-like device.

It is another object of this invention to provide an electromagnetic induction device with a writing function. The writing device of the electromagnetic induction device can be employed to transmit the handwriting trace to a tablet while writing on paper.

It is a further object of this present invention to provide a pressure degree function by the electromagnetic induction pen-like device according to this invention, thus the real handwriting trace of a user can be saved in a memory device or showed on a displayer.

It is still a further object of this present invention to provide an electromagnetic induction pen-like device with a writing function, without any battery therein, therefore the above-mentioned electromagnetic induction pen-like device does not have to be charged, and all the problems regarding the battery in the prior art, will not occur in this invention.

It is still a further object of this present invention to provide an electromagnetic induction pen-like device with a writing function. A resonant circuit is employed in the electromagnetic induction pen-like device to simplify the design and the adjustment of the circuit, and reduce the cost of the pen-like device of this invention.

In accordance with the above-mentioned objects, this invention provides an electromagnetic induction pen-like device with writing function. The above-mentioned electromagnetic induction pen-like device comprises an electromagnetic induction device at one side thereof, and a writing device on the other side thereof. The electromagnetic induction device at least comprises a first stylus body, a first magnetic body, a second magnetic body, and a first coil formed of at least one wire wound around the first magnetic body. When the electromagnetic induction device is used on a tablet, force is upwardly applied on the first stylus body to change the inductance of the first coil, and a tablet will receive the changing electromagnetic signal from the first coil. Therefore, the electromagnetic induction device can be employed as the inputting device of a tablet. On the other hand, the writing device at least comprises an ink stylus body, a third magnetic body, a fourth magnetic body, and a second coil formed of at least one wire wound around the third magnetic body. The writing device can be used as an ink pen. Preferably, the writing device can also emit an electromagnetic signal to a tablet. That is, the tablet can detect and calculate the coordinates of the writing device and save the coordinates in a memory device, such as a RAM. After communicating with the host machine, the monitor can response and display the handwriting trace. Hence, the utility of a pen-like device for a user can be improved by the design of this invention. Moreover, this invention can combine multiple functions into one pen-like device, and it is convenient for the user to carry and use.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENTS

Figure 1A:
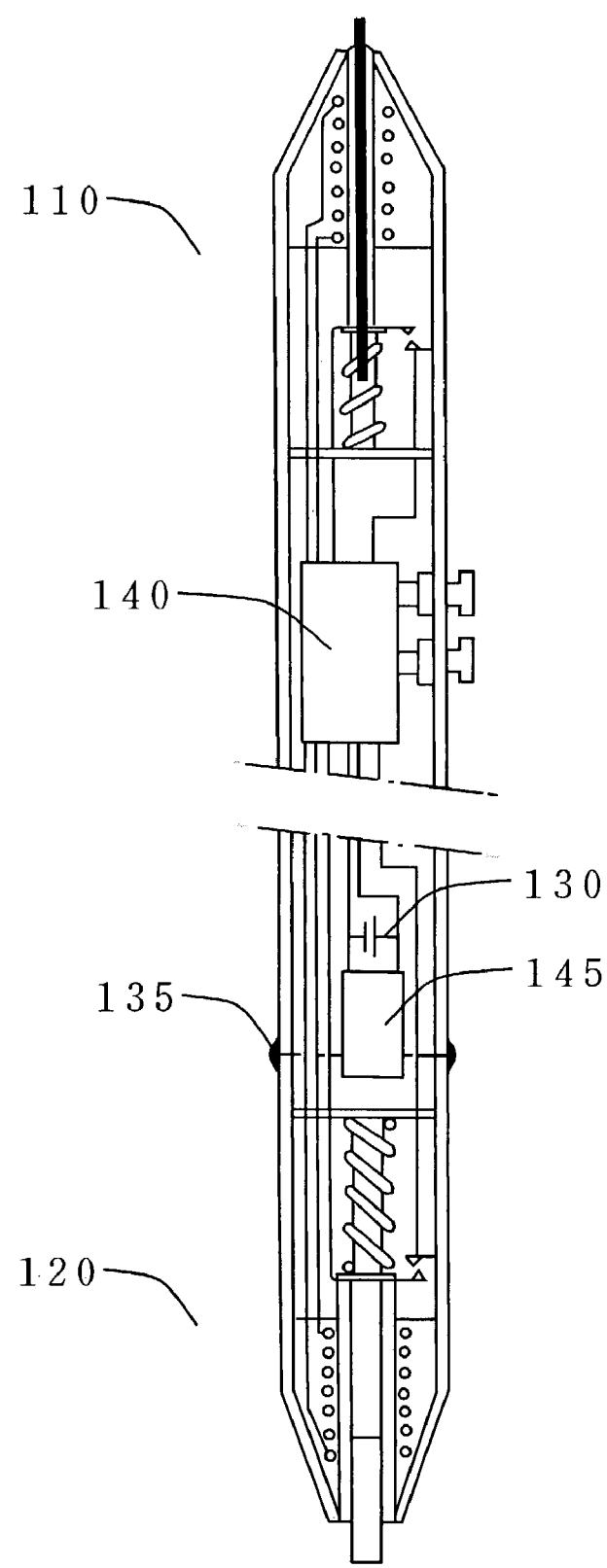
FIG. 1A shows a schematic cross-sectional view of a prior pen-like device.
Figure 1B:
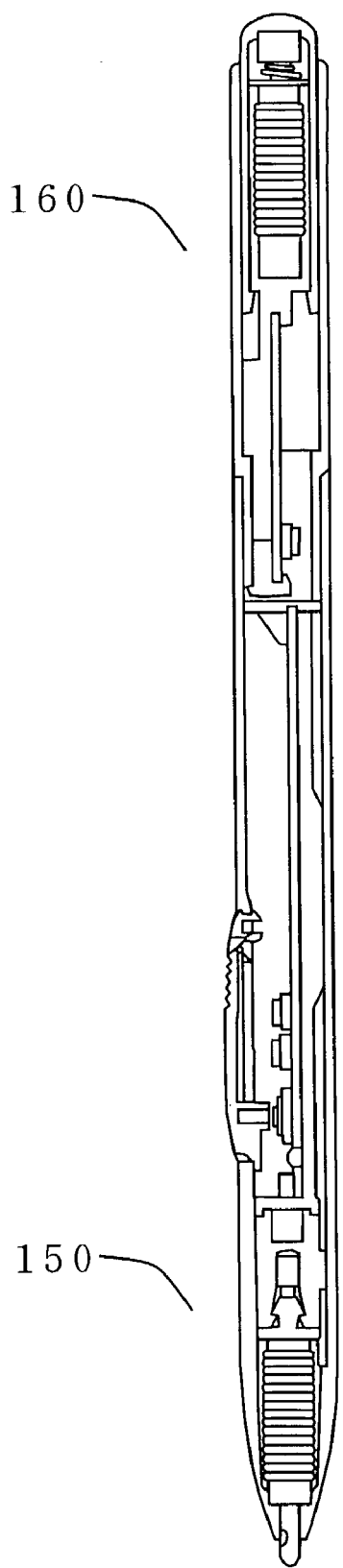
FIG. 1B shows a schematic cross-sectional view of another prior pen-like device.

Some sample embodiments of the invention will now be described in greater detail. Nevertheless, it should be recognized that the present invention can be practiced in a wide range of other embodiments besides those explicitly described, and the scope of the present invention is expressly not limited except as specified in the accompanying claims.

Then, the components disclosed in this application are not shown to scale. Some dimensions are exaggerated to the related components to provide a more clear description and comprehension of the present invention.

One preferred embodiment of this invention is an electromagnetic induction pen-like device with a writing function. The above-mentioned electromagnetic induction pen-like device comprises a supporting member, an electromagnetic induction device at one end of the supporting member, and a writing device at the other end of the supporting member. The electromagnetic induction device can be as a pointer device of a tablet for a user to perform inputting on the tablet. The writing device can be used as an ink pen. The handwriting trace of the writing device can also be scanned by a tablet while employing the writing device to paper. Thus, the handwriting trace of the writing device can be saved in a memory device, or shown on a displayer. After communicating with a host machine, a monitor can response and display the handwriting trace.

The electromagnetic induction device at least comprises a first elastic member, a first hollow cylindrical body, a first magnetic body, a second magnetic body, a first stylus body, and a first coil formed of at least one wire wound around the first magnetic body. One end of the supporting member is provided with a first housing. The first elastic element is disposed in the first housing. The first hollow cylindrical body has an outer surface and an inner surface. The inner surface of the first hollow cylindrical body is formed with a first annular member for dividing the first hollow cylindrical body into the second housing and the third housing. The third housing is formed between the first annular member and the first housing. The first hollow cylindrical body and the first annular member are preferably integrally formed.

The first magnetic body is provided with a first central through-hole, one end thereof is engaged and received in the second housing and against the first annular member. The second magnetic body is provided with a second central through-hole. The second magnetic body, being moveable is disposed in the third housing and one end thereof is against the first annular member.

When a force is upwardly applied on the first body stylus, the second magnetic body moves upwardly away from the first annular member. When there is no applied force on the first body stylus, the first elastic element forces the second magnetic body against the first annular member.

Besides, the writing device of the above-mentioned electromagnetic induction pen-like device comprises the same elements of the electromagnetic induction device. In other words, the writing device comprises a second elastic member, a second hollow cylindrical body, a third magnetic body, a fourth magnetic body, a second stylus body, and a second coil formed of at least one wire wound around the third magnetic body. The second stylus body of the writing device is an ink stylus, and thus the writing device can be an ink pen. Moreover, the writing device can be employed to write on paper and the handwriting trace of the writing device can be scanned by a tablet simultaneously. The writing device further comprises a cap. When the writing device is not used, the cap can be engaged to the writing device to prevent the leakage of ink and the hurt of the ink stylus.

Preferably, the second stylus body of the writing device is changeable. The second stylus body can be easily changed when the ink has run out or for a different utility.

In this embodiment, both of the electromagnetic induction device and the writing device can provide a pressure degree function when inputting on a tablet. Through the pressure degree function, the strength of the handwriting trace can be saved in a memory device, or shown on a displayer. Moreover, the electromagnetic induction pen-like device of this embodiment does not have to build a battery therein. Therefore, the problems with the battery, such as ageing, breakdown, or empty charge, will not occur in the pen-like device of this embodiment.

This embodiment can combine an electromagnetic induction device and a writing device into a pen-like device. The electromagnetic induction device can be a pointer device of the tablet for inputting handwriting traces. Not only can the writing device be employed as an ink pen, but it's also able to be scanned the handwriting trace by a tablet while writing on paper. Therefore, the pen-like device according to this embodiment can provide multiple functions, thus the utility of the pen-like device for a user can be improved.

Figure 2:
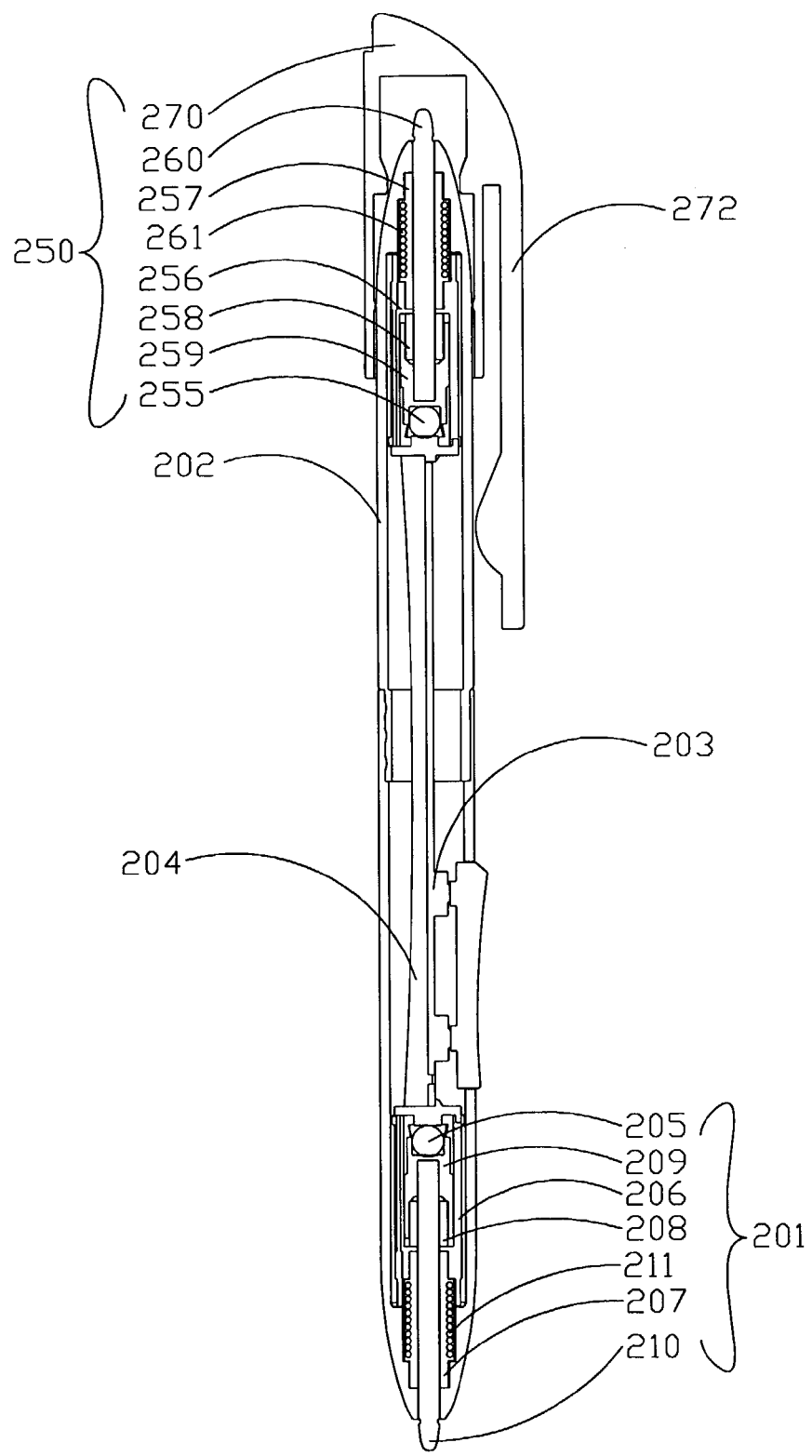
FIG. 2 is a diagram of an electromagnetic induction pen-like device with writing function according to one embodiment of this present invention.

Another preferred embodiment of this present invention is an electromagnetic induction pen-like device with a writing function. The above-mentioned electromagnetic induction pen-like device comprises an electromagnetic induction device, a writing device, and a supporting member between the electromagnetic induction device and the writing device. FIG. 2 shows an electromagnetic induction pen-like device with a writing function according to this embodiment. Referring to FIG. 2, the electromagnetic induction device 201 at least comprises a first elastic element 205, a first hollow cylindrical body 206, a first magnetic body 207, a second magnetic body 208, a first sliding member 209, a first stylus body 210, and a first coil 211 formed of at least one wire wound around the first magnetic body 207. The electromagnetic induction device 250 at least comprises a second elastic element 255, a second hollow cylindrical body 256, a third magnetic body 257, a fourth magnetic body 258, a second sliding member 259, a second stylus body 260, and a second coil 261 formed of at least one wire wound around the third magnetic body 257.

Figure 3A:
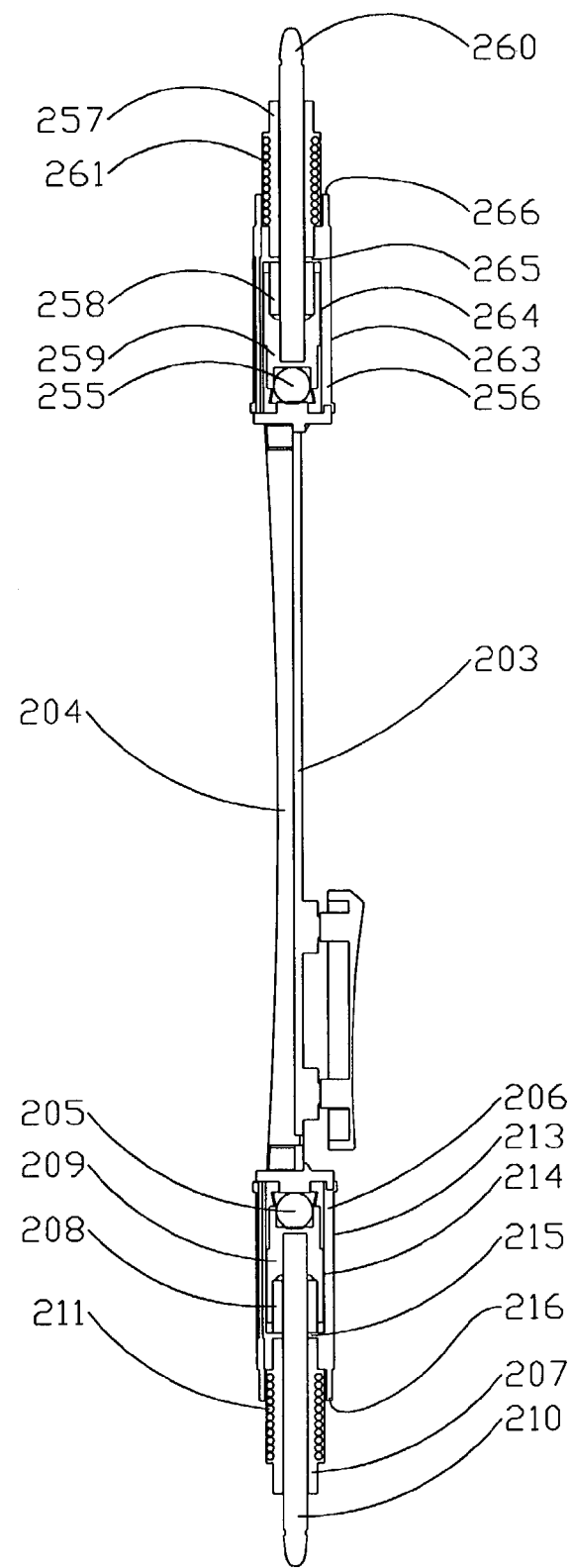
FIG. 3A shows a schematic cross-sectional view of an electromagnetic induction device of the electromagnetic induction pen-like device with a writing function, wherein the electromagnetic induction device is not in a useable state.
Figure 3B:
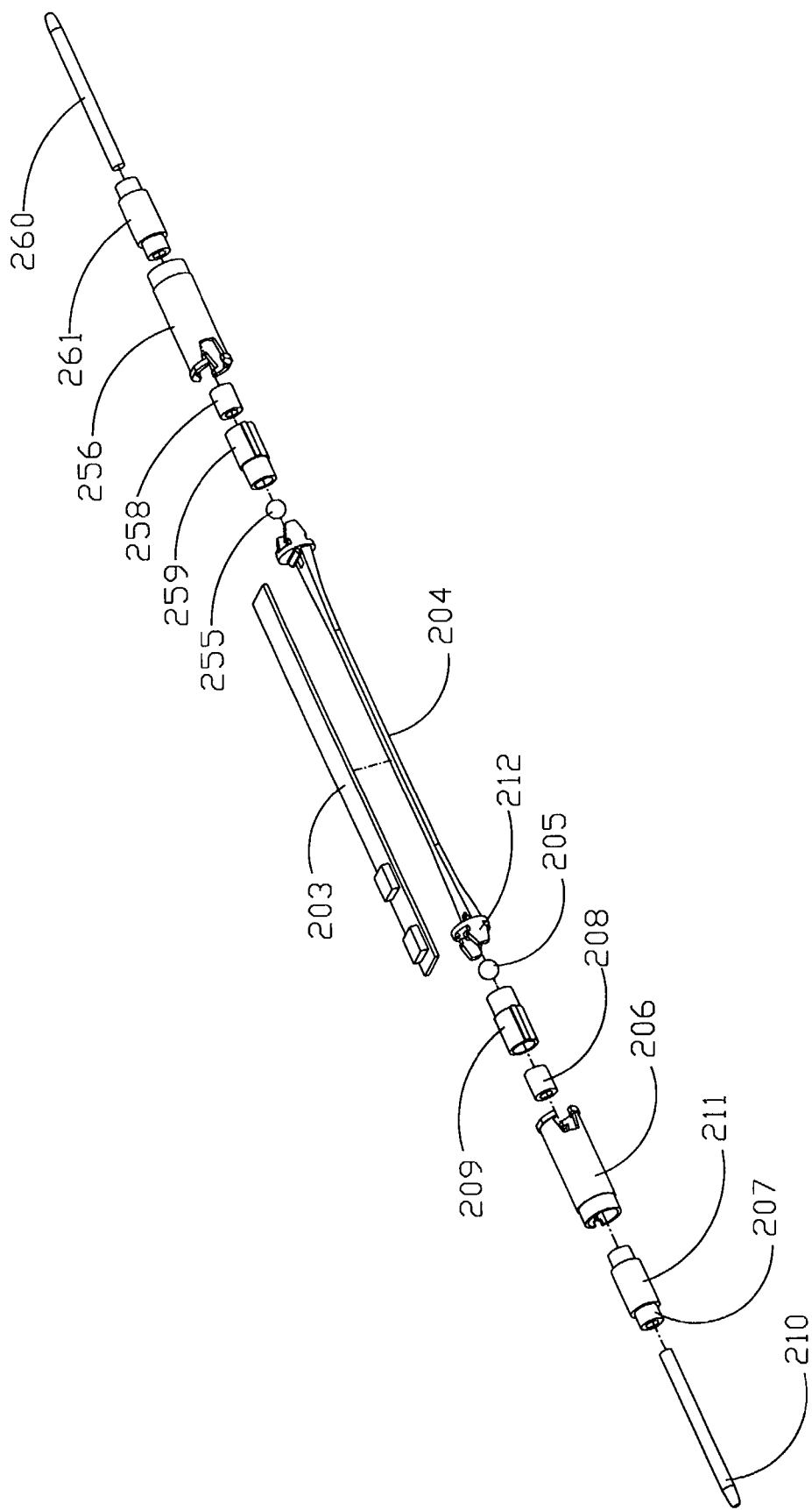
FIG. 3B shows a partially exploded view of the electromagnetic induction device of FIG. 3A.

Referring to FIGS. 3A and 3B, one end of the supporting member 204 is provided with a first housing 212. The first elastic element 205 is disposed in the first housing 212. The first elastic element 205 can be sphere, such as a rubber ball. The first hollow cylindrical body 206 has a first outer surface 213 and a first inner surface 214. One end of the first hollow cylindrical body 206 is leaned against the end of the supporting member 204 having the first housing 212, while the other end is provided with a pair of steps. One of the steps is engaged with the outer casing 202 such that the outer casing 202 can be fastened to the first hollow cylindrical body 206. Referring to FIG. 3B, one end of the first hollow cylindrical body 206 comprises a couple of concave portions for engaging the convex portions of the first housing 212. The first inner surface 214 of the first hollow cylindrical body 206 is formed with a first annular member 215 for dividing the first hollow cylindrical body 206 into the second housing and the third housing. The third housing is formed between the first annular member 215 and the first housing 212. The first hollow cylindrical body 206 and the first annular member 215 are preferably integrally formed. The first magnetic body 207 is provided with a first central through-hole, one end thereof is engaged and received in the second housing and against the first annular member 215. The first magnetic body 207 is arranged and fixed in the electromagnetic induction device 201. The second magnetic body 208 is provided with a second central through-hole. The second magnetic body 208 is moveable and disposed in the third housing and one end thereof is against the first annular member 215. Both of the first magnetic body 207 and the second magnetic body 208 are made of ferrite core. The dimensions of the first magnetic body 207 are preferably larger than the second magnetic body 208.

The first sliding member 209, being moveable is disposed in the third housing. Referring to FIG. 3A and FIG. 3B, the first sliding member 209 is provided with a first cylindrical body. The first sliding member 209 comprises a first part and a second part, wherein the second part is close to the first housing 212. The second magnetic body 208 is disposed in the first part of the first sliding member 209. The second magnetic body 208 in the first part of the first sliding member 209 and first sliding member 209 are moveable disposed in the third housing, and one end of the second magnetic body is leaned against the first annular member 215, such that the second magnetic body 209 can readily moved upward and downward within the first hollow cylindrical body 206 with the first sliding member 209. The length of the first part of the first sliding member 209 is a little shorter than that of the second magnetic body 208 so that a small gap is maintained between the first part of the first sliding member 209 and the first annular member 215 of the first hollow cylindrical body 206. The small gap is maintained for dimension tolerance of the second magnetic body 208. That is, the small gap should be a little larger than the length of the second magnetic body 208 for dimension tolerance. Referring to FIG. 3A, a fourth housing is formed within the first part of the first sliding member 209 is engaged, then one end of the first stylus body 210 is received. The first part of the first sliding member 209 is engaged, then it passes through the second central through-hole of the second magnetic body 208 such that the first sliding member 209 in conjugation with the second magnetic body 208 move upward and downward within the third housing. The second part of the first sliding member 209 is leaned against the first elastic element 205.

The first stylus body 210 passes through the first central through-hole of the first magnetic body 207 and the first annular member 215. One end of the first stylus body 210 is engaged and received in the fourth housing. The first stylus body 210 may be a pen stylus with a steel-ball pen tip. The fourth housing can provide an engaging function for the first corn body 210, such that the first corn body 210 is changeable. The first coil 211 is formed of at least one wire wound around the first magnetic body 207. In the present invention, the coil 211 is preferably formed of several wires wound around the first magnetic body 207.

Figure 3C:
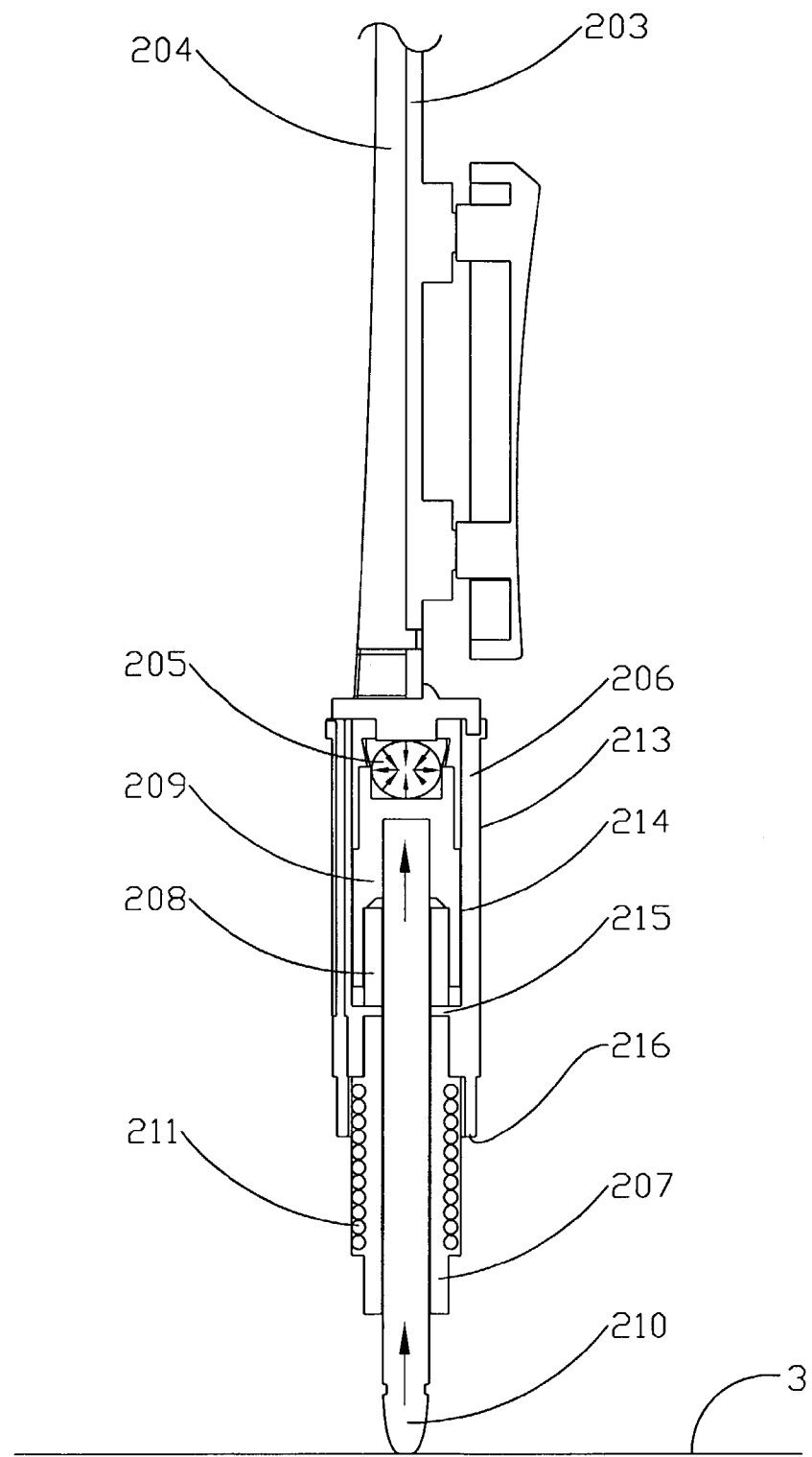
FIG. 3C shows a schematic cross-sectional view of the electromagnetic induction device of FIG. 3A, wherein the electromagnetic induction device is in useable state.

Referring to FIG. 3C, which shows a schematic cross-sectional view of the electromagnetic induction device 201 in a used state. When the first stylus body 210 is employed on the tablet 3, the depressing force onto the tablet 3 is directed upward onto the first stylus body 210. Such that the first stylus body 210 in cooperation with the first sliding member 209 move upward to force the first elastic element 205 to become deformed. The second magnetic body 208 conjugates with the first sliding member 209 to simultaneously move upward so as to change the relative distance to the first magnetic body 207, i.e. moving away from the first magnetic body 207. Thus, the inductance generated by the first coil 211 is reduced. When the upward displacement of the second magnetic body 208 increases, the inductance generated by the first coil 211 is reduced and the resonant frequency of the resonant circuit is increased. The resonant frequency is changed as the inductance of the first coil 211 is changed when the second magnetic body 208 moves upward. The tablet 3 will receive an electromagnetic field with the changing frequency emitting from the first coil 211, and then induces an inducing voltage.

When there is no force applied on the first stylus body 210, the first elastic element 205 forces the first sliding member 209 in conjugation with the second magnetic body 208 against the first annular member 215. Besides, when the tablet 3 does not apply a depressing force on the first stylus body 210, that is, when the electromagnetic induction device is not used, the predetermined distance between the first magnetic body 207 and the second magnetic body 208 is determined by the thickness of the first annular member 215. Therefore, the predetermined distance between the first magnetic body 207 and the second magnetic body 208 can be accurately and properly controlled, and not varied by a common difference of the magnetic bodies in dimension. When a force is upwardly applied on the first stylus body 210, the frequency output of the electromagnetic induction pen-like device with a writing function of this embodiment can be kept constant.

In the present electromagnetic induction device 201, the first coil 211 is formed of at least one wire wound around a first magnetic body 207 so that the first coil 211 obtains a high Q value. Hence, the capability of the first coil 211 of the electromagnetic induction device 201 for inducing/emitting an electromagnetic field is very excellent. The electromagnetic induction device 201 can directly absorb the electromagnetic field coming from an underlying tablet 3 to serve as a power source, and therefore an additional power supply such as a battery, is not required. Furthermore, the resolution of the underlying tablet 3 for detecting pressure variation of the electromagnetic induction device 201 is improved, and facilitating the signal transformation of the tablet 3 from a frequency value into a pressure value.

According to this embodiment, the electromagnetic induction pen-like device further comprises a writing device 250 at the other side of the supporting member 204, as referred to in FIG. 2. The writing device 250 at least comprises a second elastic member 255, a second hollow cylindrical body 256, a third magnetic body 257, a fourth magnetic body 258, a second sliding member 259, a second stylus body 260, and a second coil 261 formed of at least one wire wound around the third magnetic body 257. Because the disposition and the relationship of the elements of the writing device 250 are similar to the elements of the electromagnetic induction device 201. The details of the elements of the writing device 250 can be referred to in the above-mentioned illustration, and will not be described in this application. It is noted that the second stylus body 260 of the writing device may be an ink stylus, and thus the writing device can be an ink pen. Furthermore, because the writing device 250 comprises the design of the electromagnetic induction device 201, the handwriting trace of the writing device 250 also can be scanned by a tablet while writing on paper.

The writing device 250 further comprises a cap 270. When the writing device 250 is not used, the cap 270 may be engaged with the outer casing 202, as shown in FIG. 2, to prevent the ink from leaking and damaging the second stylus body 260. The cap 270 comprises an elastic portion 272 for a user to carry the pen-like device of this embodiment. According to this embodiment, the second stylus body 260 is changeable by a clipping device, not shown in the figures. When the ink of the second stylus body 260 is over or for some necessary of writing, the second stylus body 260 can be changed.

Figure 4:
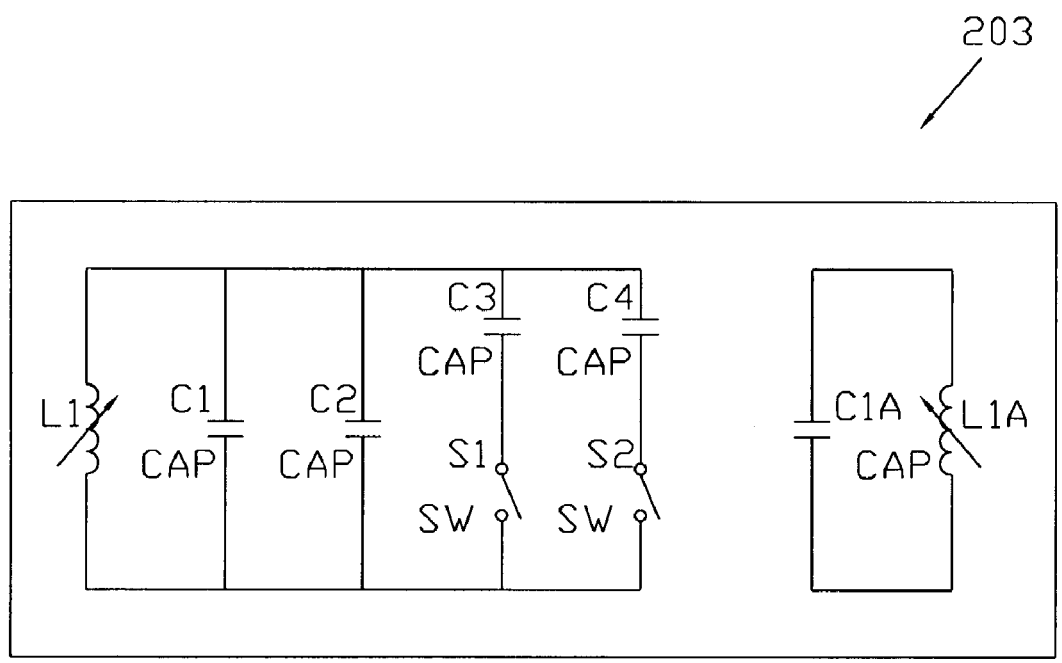
FIG. 4 is a diagram of a printed circuit board of the electromagnetic induction pen-like device with a writing function of FIG. 2.

The pen-like device of this embodiment further comprises a print circuit board 203 on the supporting member 204. The print circuit board 203 includes an inductance-capacitance type resonant circuit being electrically connected with the first coil 211 and the second coil 261. FIG. 4 shows the print circuit board of the pen-like device in FIG. 2. Referring to FIG. 4, L1, comprising the first coil 211, the first magnetic body 207 and the second magnetic body 208, is the variable inductor of the electromagnetic induction device 201, and L1A, comprising the second coil 261, the third magnetic body 257 and the fourth magnetic body 258, is the variable inductor the writing device 250. The resonant frequency is changed as the inductance of the first coil 211 is changed when the second magnetic body 208 moves upward. The tablet 3 will be induced by an electromagnetic field with the changing frequency emitted from the first coil 211, and then induce a inducing voltage. Similarly, the resonant frequency is changed as the inductance of the second coil 261 is changed when the fourth magnetic body 258 moves upward. The tablet 3 will be induced by the electromagnetic field with the changing frequency emitting from the second coil 261, and then induce a inducing voltage.

Compared with the pen-like device, the design of this invention employs a simple resonant circuit in the pen-like device. The resonant circuit is easier to be adjusted, and the cost of the pen-like device can be decreased. According to this invention, the pen-like device does not comprise any battery therein, thus any problems, such as the battery breakdown, battery ageing, electro leakage, will not occur in this invention. Moreover, the pen-like device of this invention does not have to be charged or the battery changed. The pen-like device of this invention is without any metal contact outside, thus the dangers of electro leakage for the users can be avoided. Preferably, the pen-like device of this invention can provide the pressure degree function. The writing strength of a user can be shown by the pressure degree of the first stylus body 210 or the second stylus body 260 when writing on a tablet, and the real handwriting trace of a user can be shown on a displayer, or saved in a memory device.

According to the preferred embodiments, this invention discloses an electromagnetic induction pen-like device with a writing function. The above-mentioned electromagnetic induction pen-like device comprises an electromagnetic induction device and a writing device. Each of the electromagnetic induction devices and the writing device comprises a elastic element, a hollow cylindrical body, a first magnetic body, a second magnetic body, a sliding member, a stylus body, and a coil formed of at least one wire wound around the first magnetic body. The electromagnetic induction device can be employed as a pointer device of a tablet for handwriting input. The writing device can be an ink pen. Moreover, the handwriting trace of the writing device can be scanned by a tablet while writing on paper. That is, this invention can combine the multiple functions into one pen-like device to improve the utility and the convenience of carrying for a user. Hence, the design of this invention can efficiently improve the utility of the pen-like device, and it is more convenient for using and carrying the electromagnetic induction pen-like device with writing function of this invention.

Although specific embodiments have been illustrated and described, it will be obvious to those skilled in the art that various modifications may be made without departing from what is intended to be limited solely by the appended claims.

What is claimed is:

1. An electromagnetic induction pen-like device with writing function, comprising:
   a supporting member;
   a first electromagnetic induction device at one side of said supporting member having a stylus body, wherein said electromagnetic induction device can emit an electromagnetic signal to a tablet after said tablet contacts and applies a force against said stylus body to move said stylus body; and
   a writing device at another side of said supporting member having an ink stylus and a second electromagnetic induction device, wherein said ink stylus supplies ink for writing and said second electromagnetic induction device emits an electromagnetic signal to a tablet after said tablet contacts and applies a force against said ink stylus to move said ink stylus.

2. An electromagnetic induction pen-like device with writing function, comprising:
   a supporting member;
   an electromagnetic induction device at one side of said supporting member, wherein said electromagnetic induction device can emit an electromagnetic signal to a tablet, and said electromagnetic induction device comprises:
      an first elastic element disposed in a first housing, wherein said first housing is at one end of said supporting member;
      a first hollow cylindrical body with one end being leaned against the end of said supporting member having said first housing, said first hollow cylindrical body having a first outer surface and a first inner surface, said first inner surface formed with a first annular member for dividing said first hollow cylindrical body into a second housing and a third housing, said third housing formed between said first annular member and said first housing;
      a first magnetic body having a first central through-hole, said first magnetic body with one end being received in said second housing and against said first annular member;
      a second magnetic body having a second central through-hole, one end of said second magnetic body being against said first annular member;
      a first sliding member movably disposed in said third housing, said first sliding member having a first cylindrical body, said first sliding member comprising a first part and a second part, and the length of said first part being a little shorter than that of said second magnetic body, said first part having a fourth housing formed therein, and said second magnetic body is disposed in said first part such that said first sliding member moves upward and downward in conjugation with said second magnetic body, said second part of said first sliding member being leaned against said first elastic element;

a first stylus body passing through said first central through-hole of said first magnetic body and said first annular member and one end thereof being engaged then received in said fourth housing; and a first coil formed of at least one wire wound around said first magnetic body: and a writing device at another side of said supporting member, wherein said writing device can emit an electromagnetic signal to a tablet.

3. The pen-like device according to claim 2, wherein when a force is upward applied on said first stylus body, said first sliding member in conjugation with said second magnetic body move upward away from said first annular member, and when there is no force applied on said first stylus body, said first elastic element forces said first sliding member in conjugation with said second magnetic body against said first annular member.

4. The pen-like device according to claim 2, wherein said writing device comprises:

a second elastic element disposed in a fifth housing, wherein said fifth housing is at another end of said supporting member;

a second hollow cylindrical body with one end being leaned against the end of said supporting member having said fifth housing, said second hollow cylindrical body having a second outer surface and a second inner surface, said second inner surface formed with a second annular member for dividing said second hollow cylindrical body into a sixth housing and a seventh housing, said seventh housing formed between said second annular member and said fifth housing;

a third magnetic body having a third central through-hole, said third magnetic body with one end being engaged and received in said sixth housing and against said second annular member;

a fourth magnetic body having a fourth central through-hole, one end of said fourth magnetic body being against said second annular member;

a second sliding member movably disposed in said seventh housing, said second sliding member having a second cylindrical body, said second sliding member comprising a third part and a fourth part, and the length of said third part being a little shorter than that of said fourth magnetic body, said third part having a eighth housing formed therein, and said fourth magnetic body is disposed in said third part such that said second sliding member moves upward and downward in conjugation with said fourth magnetic body, said second part of said second sliding member being leaned against said second elastic element;

a second stylus body passing through said third central through-hole of said third magnetic body and said second annular member and one end thereof being engaged and received in said eighth housing; and a second coil formed of at least one wire wound around said third magnetic body.

5. The pen-like device according to claim 4, wherein when a force is upward applied on said second stylus body, said second sliding member in conjugation with said fourth magnetic body move upward away from said second annular member, and when there is no force applied on said second stylus body, said second elastic element forces said second sliding member in conjugation with said fourth magnetic body against said second annular member.

6. The pen-like device according to claim 2, wherein each of said first magnetic body and said second magnetic body is formed with a ferrite core.

7. The pen-like device according to claim 2, wherein said fourth housing provides an engaging function for said first stylus body, so that said first stylus body is changeable.

8. The pen-like device according to claim 2, wherein said first stylus body is a pen stylus with a steel-ball pen tip.

9. The pen-like device according to claim 2, wherein said first elastic element is ball-shaped.

10. The pen-like according to claim 4, each of said third magnetic body and said fourth magnetic body is formed with a ferrite core.

11. The pen-like device according to claim 4, wherein said eighth housing provides an engaging function for said first stylus body, so that said first stylus body is changeable.

12. The pen-like device according to claim 4, wherein said second stylus body is an ink pen stylus.

13. The pen-like device according to claim 4, wherein said second elastic element is sphere.

14. The pen-like device according to claim 1, further comprising:

an outer casing for receiving said electromagnetic induction pen-like device; and a print circuit board disposed on said supporting member, said print circuit board having an inductance-capacitance type resonant circuit being electrically connected with said first coil and said second coil.

15. An electromagnetic induction pen-like device with writing function, comprising:

a supporting member with one end formed with a first housing;

an first elastic element disposed in said first housing;

a first hollow cylindrical body with one end being leaned against the end of said supporting member having said first housing, said first hollow cylindrical body having a first outer surface and a first inner surface, said first inner surface formed with a first annular member for dividing said first hollow cylindrical body into a second housing and a third housing, said third housing formed between said first annular member and said first housing;

a first magnetic body having a first central through-hole, said first magnetic body with one end being engaged and received in said second housing and against said first annular member;

a second magnetic body having a second central through-hole, one end of said second magnetic body being against said first annular member;

a first sliding member movably disposed in said third housing, said first sliding member having a first cylindrical body, said first sliding member comprising a first part and a second part, and the length of said first part being a little shorter than that of said second magnetic body, said first part having a fourth housing formed therein, and said second magnetic body is disposed in said first part such that said first sliding member moves upward and downward in conjugation with said second magnetic body, said second part of said first sliding member being leaned against said first elastic element;

a first stylus body passing through said first central through-hole of said first magnetic body and said first annular member and one end thereof being engaged and received in said fourth housing;

a first coil formed of at least one wire wound around said first magnetic body;

a second elastic element disposed in a fifth housing, wherein said fifth housing is at another end of said supporting member;

a second hollow cylindrical body with one end being leaned against the end of said supporting member having said fifth housing, said second hollow cylindrical body having a second outer surface and a second inner surface, said second inner surface formed with a second annular member for dividing said second hollow cylindrical body into a sixth housing and a seventh housing, said seventh housing formed between said second annular member and said fifth housing;

a third magnetic body having a third central through-hole, said third magnetic body with one end being engaged and received in said sixth housing and against said second annular member;

a fourth magnetic body having a fourth central through-hole, one end of said fourth magnetic body being against said second annular member;

a second sliding member movably disposed in said seventh housing, said second sliding member having a second cylindrical body, said second sliding member comprising a third part and a fourth part, and the length of said third part being a little shorter than that of said fourth magnetic body, said third part having a eighth housing formed therein, and said fourth magnetic body is disposed in said third part such that said second sliding member moves upward and downward in conjugation with said fourth magnetic body, said second part of said second sliding member being leaned against said second elastic element;

a second stylus body passing through said third central through-hole of said third magnetic body and said second annular member and one end thereof being engaged and received in said eighth housing; and a second coil formed of at least one wire wound around said third magnetic body.

16. The pen-like device according to claim 15, wherein when a force is upward applied on said first stylus body, said first sliding member in conjugation with said second magnetic body move upward away from said first annular member, and when there is no force applied on said first stylus body, said first elastic element forces said first sliding member in conjugation with said second magnetic body against said first annular member.

17. The pen-like device according to claim 15, wherein when a force is upward applied on said second stylus body, said second sliding member in conjugation with said fourth magnetic body move upward away from said second annular member, and when there is no force applied on said second stylus body, said second elastic element forces said second sliding member in conjugation with said fourth magnetic body against said second annular member.

18. The pen-like device according to claim 15, wherein said first stylus body is a pen stylus with a steel-ball pen tip.

19. The pen-like device according to claim 15, wherein said second stylus body is an ink pen stylus.

20. The pen-like device according to claim 15, wherein each of said magnetic body is formed with a ferrite core.

21. The pen-like device according to claim 15, further comprising:

an outer casing for receiving said electromagnetic induction pen-like device; and a print circuit board disposed on said supporting member, said print circuit board having an inductance-capacitance type resonant circuit being electrically connected with said first coil and said second coil.

22. The pen-like device according to claim 21, wherein when a force is upward applied on said first stylus body, the force is further applied on said first sliding member through said first stylus body such that said first sliding member in conjugation with said second magnetic body move upward to make said first elastic element deformed and changing a predetermined distance between said second magnetic body and said first magnetic body, thereby changing an inductance generated by said first coil and thus changing a resonance frequency of said resonant circuit.

23. The pen-like device according to claim 21, wherein when a force is upward applied on said second stylus body, the force is further applied on said second sliding member through said second stylus body such that said second sliding member in conjugation with said fourth magnetic body move upward to make said second elastic element deformed and changing a predetermined distance between said fourth magnetic body and said third magnetic body, thereby changing an inductance generated by said second coil and thus changing a resonance frequency of said resonant circuit.

* * * * *